(12) United States Patent
Dunn, Jr.

(10) Patent No.: US 6,294,759 B1
(45) Date of Patent: Sep. 25, 2001

(54) PORTABLE SOLDERING STATION WITH A PLURALITY OF TOOLS POSITIONED IN ASSOCIATED RECESSES

(76) Inventor: Jesse A. Dunn, Jr., 2405 Old Salem Rd., Conyers, GA (US) 30013

( * ) Notice: Subject to any disclaimer, the term of this patent is extended or adjusted under 35 U.S.C. 154(b) by 0 days.

(21) Appl. No.: 09/684,477

(22) Filed: Oct. 6, 2000

(51) Int. Cl.[7] .................................................. B23K 3/02
(52) U.S. Cl. .......................... 219/231; 219/242; 228/18; 228/51; 228/57; 206/373; 206/563
(58) Field of Search ................... 219/231, 242; 228/18, 51, 57; 206/373, 372, 562–564, 565

(56) References Cited

U.S. PATENT DOCUMENTS

| D. 383,905 | 9/1997 | Stokes et al. . | |
|---|---|---|---|
| 1,309,273 | * 7/1919 | Cave | 228/57 |
| 1,466,139 | * 8/1923 | Michie | 219/242 |
| 2,734,986 | * 2/1956 | Gameros | 219/242 |
| 3,583,556 | * 6/1971 | Wagner | 206/373 |
| 3,703,624 | 11/1972 | Simsack . | |
| 4,204,597 | 5/1980 | Fischer . | |
| 4,681,219 | * 7/1987 | Kitchens | 206/315.11 |
| 5,004,103 | 4/1991 | Connors et al. | 206/372 |
| 5,062,529 | * 11/1991 | Blair | 206/349 |
| 5,133,455 | * 7/1992 | Chow | 206/374 |
| 5,152,448 | * 10/1992 | Williams | 228/51 |
| 5,253,739 | 10/1993 | King . | |
| 5,259,502 | * 11/1993 | Chan | 206/372 |
| 5,641,170 | 6/1997 | Helm . | |
| 5,782,325 | 7/1998 | O'Shea et al. . | |
| 6,109,446 | * 8/2000 | Foote | 206/759 |

* cited by examiner

Primary Examiner—John A. Jeffery

(57) ABSTRACT

A soldering station system for transporting, utilizing, and storing the unique tools required for soldering electrical wiring assemblies, printed circuit boards, and other small electronic sub-assemblies is provided. The soldering station system includes a tool case with a bottom portion, a plurality of side portions, and a top portion, a tool pallet assembly which is coupled to an interior surface of the tool case, the tool pallet has a plurality of interior recesses, and a plurality of tools adapted for working on electronic assemblies and positioned in the interior recesses of the tool pallet assembly.

11 Claims, 5 Drawing Sheets

PORTABLE SOLDERING STATION WITH A PLURALITY OF TOOLS POSITIONED IN ASSOCIATED RECESSES

BACKGROUND OF THE INVENTION

1. Field of the Invention

The present invention relates to tool carriers and more particularly pertains to a new soldering station system for transporting, utilizing, and storing the unique tools required for soldering electrical wiring assemblies, printed circuit boards, and other small electronic sub-assemblies.

2. Description of the Prior Art

The use of tool carriers is known in the prior art. More specifically, tool carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,703,624; U.S. Pat. No. 4,204,597; U.S. Pat. No. 5,641,170; U.S. Pat. No. 5,253,739; U.S. Pat. No. 5,782,325; and U.S. Pat. No. Des. 383,905.

While these devices fulfill their respective, particular objectives and requirements, the aforementioned patents do not disclose a new soldering station system. The inventive device includes a tool case with a bottom portion, a plurality of side portions, and a top portion, a tool pallet assembly which is coupled to an interior surface of the tool case, the tool pallet has a plurality of interior recesses, and a plurality of tools adapted for working on electronic assemblies and positioned in the interior recesses of the tool pallet assembly.

In these respects, the soldering station system according to the present invention substantially departs from the conventional concepts and designs of the prior art, and in so doing provides an apparatus primarily developed for the purpose of transporting, utilizing, and storing the unique tools required for soldering electrical wiring assemblies, printed circuit boards, and other small electronic sub-assemblies.

SUMMARY OF THE INVENTION

In view of the foregoing disadvantages inherent in the known types of tool carriers now present in the prior art, the present invention provides a new soldering station system construction wherein the same can be utilized for transporting, utilizing, and storing the unique tools required for soldering electrical wiring assemblies, printed circuit boards, and other small electronic sub-assemblies.

The general purpose of the present invention, which will be described subsequently in greater detail, is to provide a new soldering station system apparatus and method which has many of the advantages of the tool carriers mentioned heretofore and many novel features that result in a new soldering station system which is not anticipated, rendered obvious, suggested, or even implied by any of the prior art tool carriers, either alone or in any combination thereof.

To attain this, the present invention generally comprises a tool case with a bottom portion, a plurality of side portions, and a top portion, a tool pallet assembly which is coupled to an interior surface of the tool case, the tool pallet has a plurality of interior recesses, and a plurality of tools adapted for working on electronic assemblies and positioned in the interior recesses of the tool pallet assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new soldering station system apparatus and method which has many of the advantages of the tool carriers mentioned heretofore and many novel features that result in a new soldering station system which is not anticipated, rendered obvious, suggested, or even implied by any of the prior art tool carriers, either alone or in any combination thereof.

It is another object of the present invention to provide a new soldering station system which may be easily and efficiently manufactured and marketed.

It is a further object of the present invention to provide a new soldering station system which is of a durable and reliable construction.

An even further object of the present invention is to provide a new soldering station system which is susceptible of a low cost of manufacture with regard to both materials and labor, and which accordingly is then susceptible of low prices of sale to the consuming public, thereby making such soldering station system economically available to the buying public.

Still yet another object of the present invention is to provide a new soldering station system which provides in the apparatuses and methods of the prior art some of the advantages thereof, while simultaneously overcoming some of the disadvantages normally associated therewith.

Still another object of the present invention is to provide a new soldering station system for transporting, utilizing, and storing the unique tools required for soldering electrical wiring assemblies, printed circuit boards, and other small electronic sub-assemblies.

Yet another object of the present invention is to provide a new soldering station system which includes a tool case with a bottom portion, a plurality of side portions, and a top portion, a tool pallet assembly which is coupled to an interior surface of the tool case, the tool pallet has a plurality of interior recesses, and a plurality of tools adapted for working on electronic assemblies and positioned in the interior recesses of the tool pallet assembly.

Still yet another object of the present invention is to provide a new soldering station system that allows hot soldering irons to be stored and transported without damage to the case or other tools.

Even still another object of the present invention is to provide a new soldering station system that provides an organization of tools and materials promoting an efficient flow of work.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
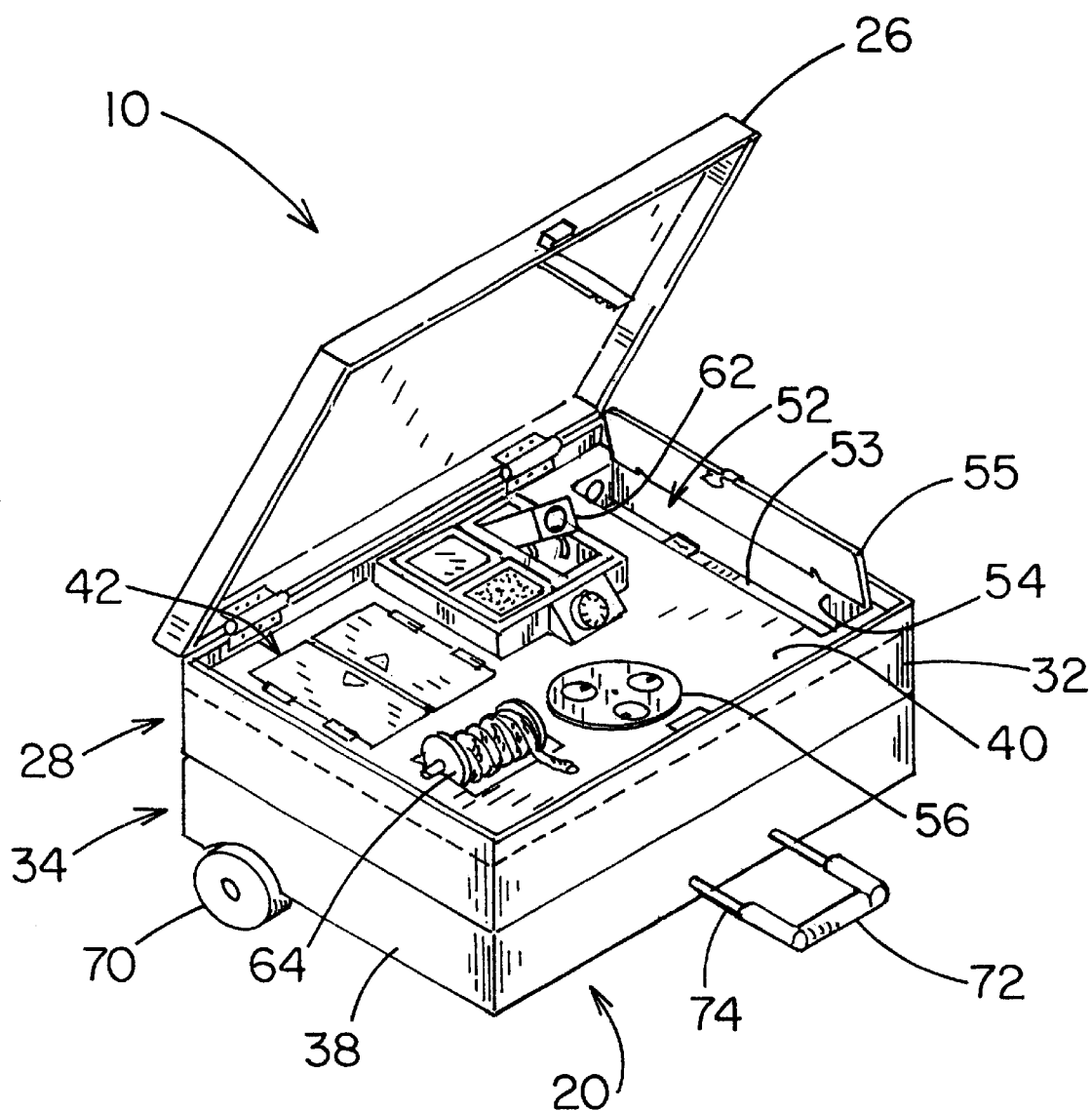
FIG. 1 is a schematic perspective view of a new soldering station system according to the present invention.
Figure 2:
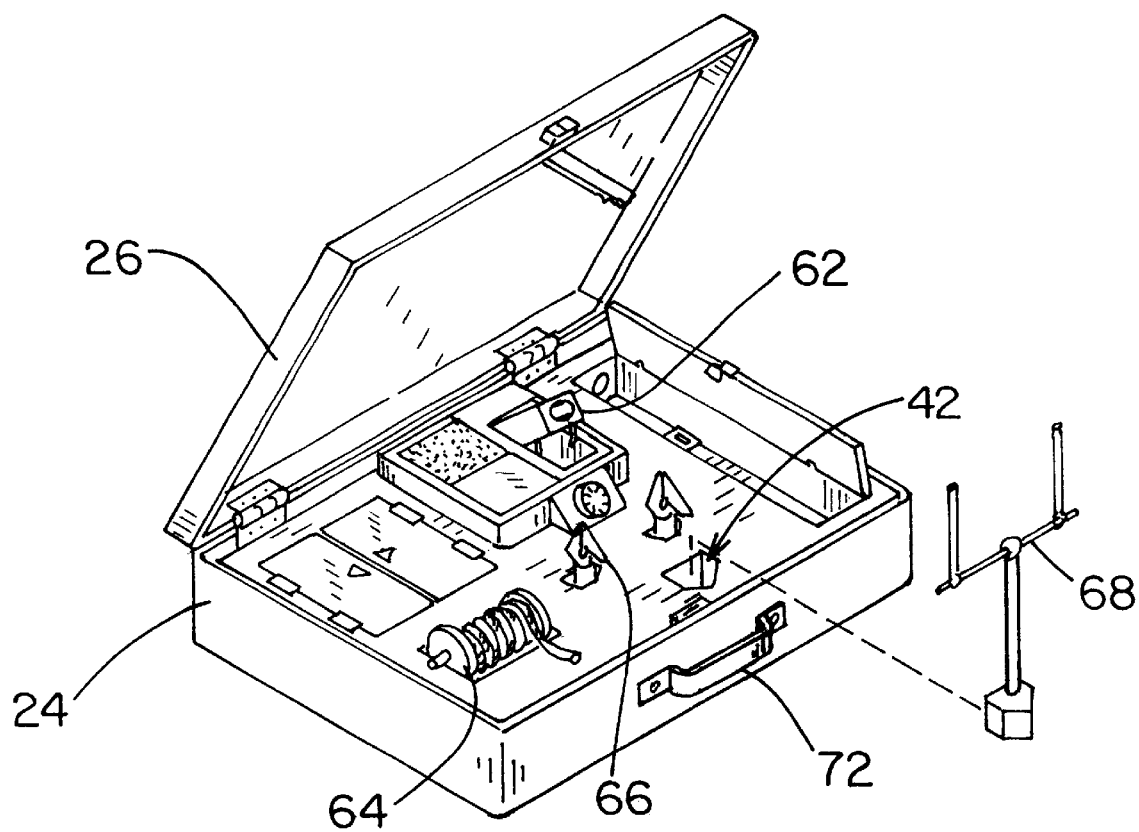
FIG. 2 is a schematic perspective view of an embodiment of the present invention.
Figure 4:
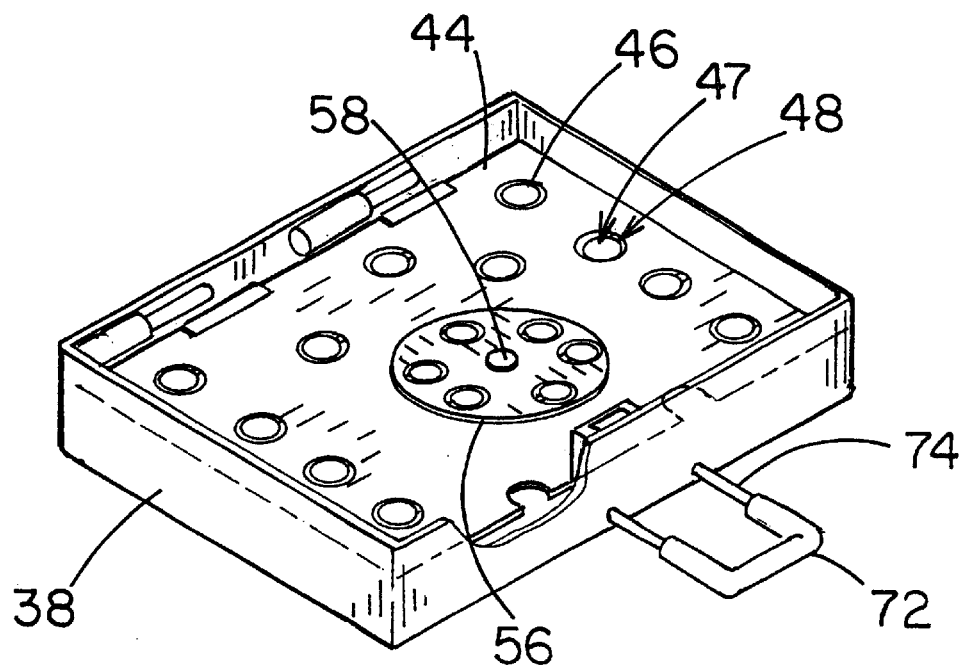
FIG. 4 is a schematic perspective view of the central portion of the tool case of the present invention.
Figure 3:
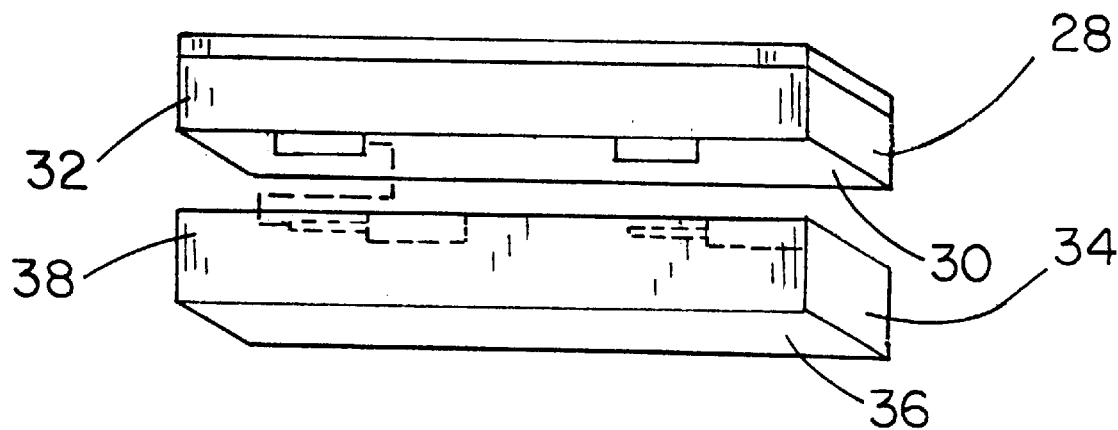
FIG. 3 is a schematic rear view of the tool case of the present invention, particularly the removable hinging feature.
Figure 5:
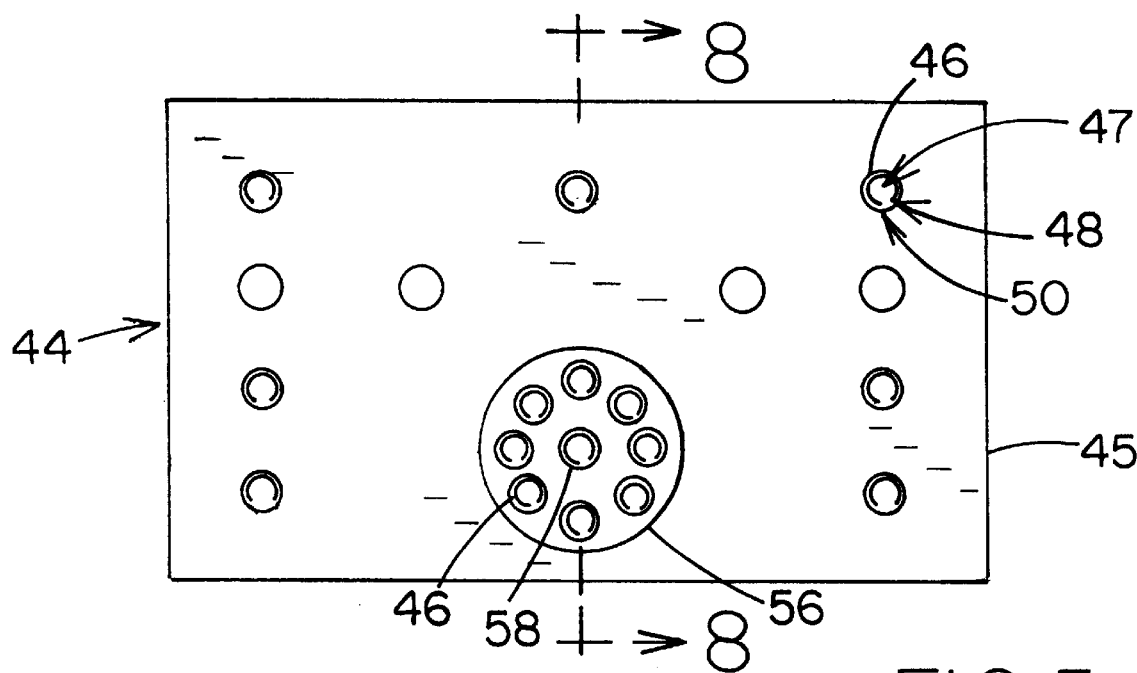
FIG. 5 is a schematic top view of the tool pallet present invention.

With reference now to the drawings, and in particular to FIGS. 1 through 8 thereof, a new soldering station system embodying the principles and concepts of the present invention and generally designated by the reference numeral 10 will be described.

As best illustrated in FIGS. 1 through 8, the soldering station system 10 generally comprises a tool case 20, a tool pallet assembly 40, and a plurality of tools 60.

The tool case 20 includes a bottom portion 22, a plurality of side portions 24, and a top portion 26.

The tool pallet assembly 40 is coupled to and interior surface of the case 20. The tool pallet assembly 40 includes a plurality of interior recesses 42.

Each one of the plurality of tools 60 is positioned in an associated one of the interior recesses 42 of the tool pallet assembly 40 such that each of the plurality of tools 60 is readily available and its presence or absence is visually apparent to the operator. Thus the probability of losing one of the plurality of tools 60 is reduced.

In an embodiment the tool case 20 includes a central portion 28 and a lower portion 34. The lower portion 34 includes a lower portion bottom wall 36 and four lower portion side walls 38 extending upwardly from a perimeter edge of the lower portion bottom wall 36. The central portion 28 includes a central portion bottom wall 30 and four central portion side walls 32 extending upwardly from a perimeter edge of the central portion bottom wall 30. A rear one of the lower portion side walls 38 is removablly hingably coupled to a rear one of the central portion side walls 32 such that a bottom surface of the central portion 28, along with the lower portion side walls 38 and the lower portion bottom wall 36, form a cavity when the lower portion 34 is hinged in a closed portion relative to the central portion 28.

Optionally, a worktop pallet 44 is removably coupled to an interior of the lower portion 34. The worktop pallet 44 includes a plurality of keyed sockets 46. Each one of the plurality of keyed sockets 46 includes a cavity 48. The cavity 48 includes at least one grooved portion 50. The cavity 48 and the grooved portion 50 are for receiving and retaining one of the plurality of tools 60 in a static vertical position relative to the worktop pallet 44.

The plurality of tools 60 includes a soldering iron 62, a solder dispensing spool 64, a plurality of wire clamps 66, and a printed circuit board clamp 68. The tools 60 are designed for working on wiring and electronic assemblies.

The tool pallet assembly 40 includes a soldering iron storage compartment 52. The soldering iron storage compartment 52 includes a bottom surface 53, a plurality of side surfaces 54, and a top surface 55. The top surface 55 is hingably coupled to one of the plurality of sides 54. Each of the plurality of side surfaces 54, the bottom surface 53, and the top surface 55 are porcelain for storing a soldering iron 62 in the soldering iron storage compartment 52 when the soldering iron 62 is hot. Thus the soldering iron 62 is prevented from damaging the case 20, the tool pallet assembly 40, or any one of the plurality of tools 60 by burning or melting when the soldering iron 62 is stored in the soldering iron storage compartment 52.

Optionally a plurality of wheels 70 is coupled to the lower portion 34 for facilitating transport of the soldering station system 10 by rolling.

Figure 6:
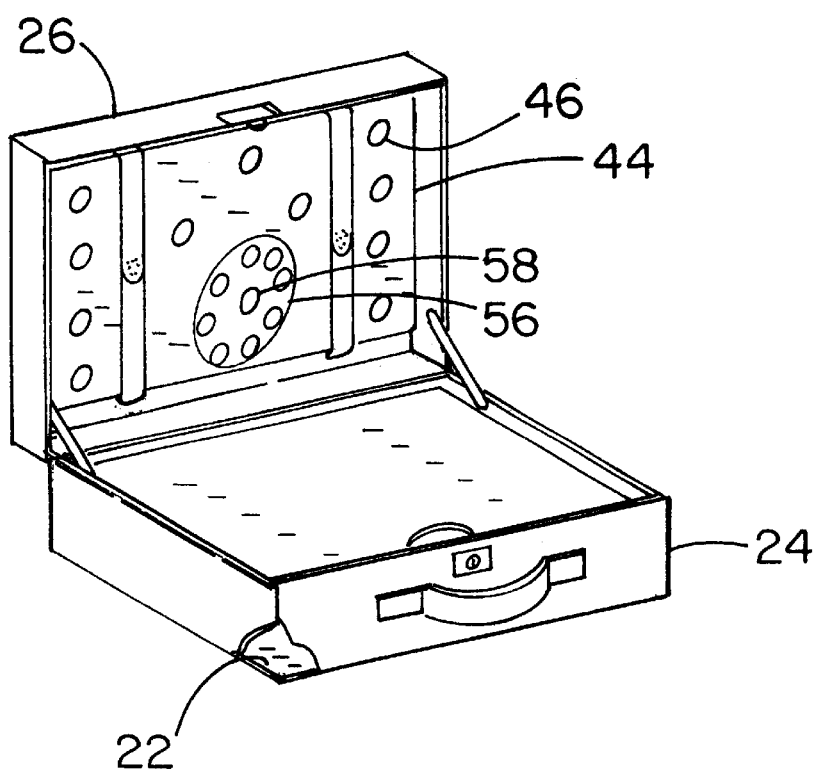
FIG. 6 is a schematic perspective view of an embodiment of the present invention.

In an embodiment shown in FIG. 6 of the drawings, the worktop pallet 44 may be coupled to the top portion 26 of a tool case 20 without wheels.

Figure 7:
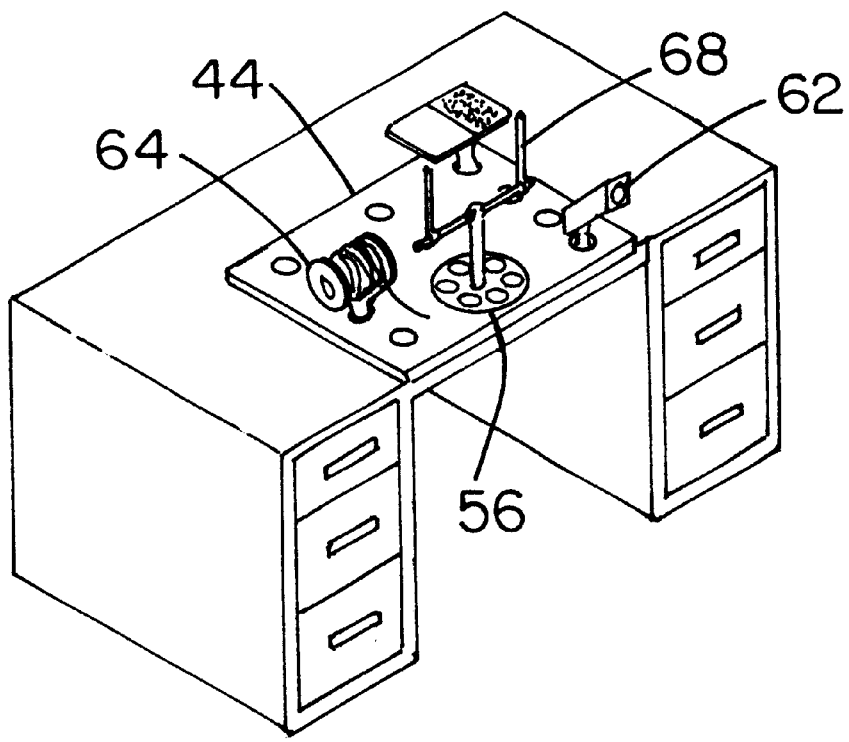
FIG. 7 is a schematic perspective view of the tool pallet of the present invention deployed on a surface.
Figure 8:
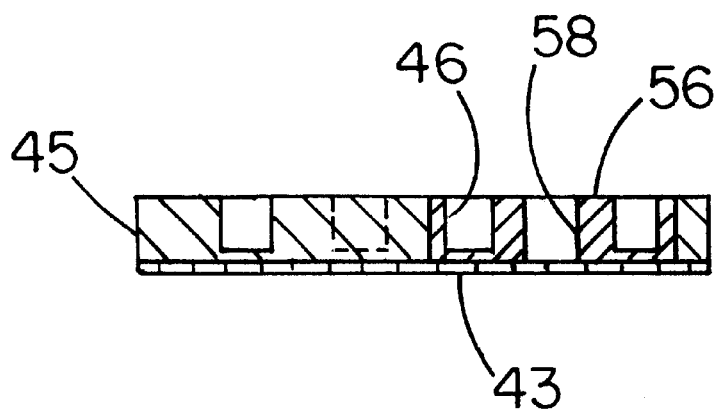
FIG. 8 is a schematic cross-sectional view of the worktop pallet of the present invention taken along line 8—8 of FIG. 5

FIG. 7 of the drawings shows the pallet 44, soldering iron 62, circuit board clamp 68, and solder dispensing spool 64 deployed on a surface.

Preferably the system 10 includes a handle portion 72. The handle portion 72 may include at least one telescopic assembly 74. The telescopic assembly 74 comprising a plurality of cylindrical portions coupled telescopically. The handle portion 72 may be coupled to an outer surface of the lower portion bottom wall 36. The handle portion 72 is for facilitating transport of the soldering station system 10.

The worktop pallet 44 may include a backing member 43, a main portion 45 and a rotating portion 56.

The main portion 45 preferably is substantially rectangular. The main portion 45 includes a hole 47. The hole 47 is substantially circular for receiving the rotating portion 56, such that a top surface of the main portion 45 is substantially coplanar with a top surface of the rotating portion 56. The main portion 45 includes a plurality of keyed sockets 46 for receiving the tools 60.

The rotating portion 56 is substantially circular and includes a plurality of keyed sockets 46 positioned in a spaced relationship adjacent to a perimeter edge of the rotating portion 56. The rotating portion 58 includes a center keyed socket 58 positioned along a longitudinal axis of the rotating portion 56. The rotating portion 56 is rotatably coupled to the backing member 43, such that the top surface and the plurality of keyed sockets 46 of the rotating portion 56 can be rotated with respect to the longitudinal axis of the rotating portion 56.

In use, the system is transported, by the user, to the desired work area. The tool case is opened. If a suitable work surface is available the worktop pallet is removed and placed on the work surface. If no suitable work surface is available the worktop pallet is left in the case. The tools are positioned on the worktop plated such that an orderly flow of materials is provided. The soldering iron is removed from the soldering iron storage compartment and power is applied. The wiring assembly, printed circuit board, or other electronic sub-assembly is clamped into position as desired and the repair or assembly work is performed in the conventional manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A soldering station system comprising:
    a tool case having a bottom portion, a plurality of side portions, and a top portion;
    a tool pallet assembly coupled to an interior surface of said case, said tool pallet having a plurality of interior recesses;
    a plurality of tools, each one of said plurality of tools positioned in an associated one of said interior recesses of said tool pallet such that each of said plurality of tools is readily available and its presence or absence is visually apparent to the operator reducing the probability of losing one of said plurality of tools; and
    said tool pallet having a soldering iron storage compartment, said soldering iron storage compartment having a bottom surface, a plurality of side surfaces, and a top surface; said top surface being hingably coupled to one of said plurality of sides, each of said plurality of side surfaces, said bottom surface, and said top surface being porcelain for storing a soldering iron in said soldering iron storage compartment when said soldering iron is hot whereby said soldering iron is prevented from damaging said case, said tool pallet, or any one of said plurality of tools by burning or melting when said soldering iron is stored in said soldering iron storage compartment.

2. The soldering station system of claim 1, further comprising:
    said tool case having a central portion and a lower portion, said lower portion having a lower portion bottom wall and four lower portion side walls extending upwardly from a perimeter edge of said lower portion bottom wall;
    said central portion having a central portion bottom wall and four central portion side walls extending upwardly from a perimeter edge of said central portion bottom wall, a rear one of said lower portion side walls being removably hingably coupled to a rear one of said central portion side walls such that a bottom surface of said central portion, along with said lower side walls and said lower portion bottom wall form a cavity when said lower portion is hinged in a closed portion relative to said central portion.

3. The soldering station system of claim 2, further comprising:
    a worktop pallet, said worktop pallet being removably coupled to an interior of said lower portion;
    said worktop pallet having a plurality of keyed sockets; each one of said plurality of keyed sockets having a cavity; said cavity having at least one grooved portion;
    said cavity and said grooved portion being for receiving and retaining one of said plurality of tools in a static vertical position relative to said worktop pallet.

4. The soldering station system of claim 2, further comprising:
    a plurality of wheels, said wheels being coupled to said lower portion for facilitating transport of said soldering station system by rolling;
    a handle portion, said handle portion having at least one telescopic assembly, said telescopic assembly comprising a plurality of cylindrical portions coupled telescopically;
    said handle portion being coupled to an outer surface of said bottom wall of said lower portion;
    said handle portion being for facilitating transport of said soldering station system.

5. The soldering station system of claim 1, further comprising:
    a worktop pallet, said worktop pallet being removably coupled to said top portion of said tool case;
    said worktop pallet having a plurality of keyed sockets, each one of said plurality of keyed sockets having a cavity, said cavity having at least one grooved portion, said cavity and said grooved portion being for receiving and retaining one of said plurality of tools in a static vertical position relative to said worktop pallet.

6. The soldering station system of claim 1, further comprising:
    said tool case having a central portion and a lower portion, said lower portion having a lower portion bottom wall and four lower portion side walls extending upwardly from a perimeter edge of said lower portion bottom wall;
    said central portion having a central portion bottom wall and four central portion side walls extending upwardly from a perimeter edge of said central portion bottom wall, a rear one of said lower portion side walls being removably hingably coupled to a rear one of said central portion side walls such that a bottom surface of said central portion, along with said lower side walls and said lower portion bottom wall form a cavity when said lower portion is hinged in a closed portion relative to said central portion;

a worktop pallet, said worktop pallet being removably coupled to an interior of said lower portion;

said worktop pallet having a plurality of keyed sockets; each one of said plurality of keyed sockets having a cavity; said cavity having at least one grooved portion;

said cavity and said grooved portion being for receiving and retaining one of said plurality of tools in a static vertical position relative to said worktop pallet;

said plurality of tools including a soldering iron, a solder dispensing spool, a plurality of wire clamps, and a printed circuit board clamp, said tools being for working of wiring and electronic assemblies;

a plurality of wheels, said wheels being coupled to said lower portion for facilitating transport of said soldering station system by rolling;

a handle portion, said handle portion having at least one telescopic assembly, said telescopic assembly comprising a plurality of cylindrical portions coupled telescopically;

said handle portion being coupled to an outer surface of said bottom wall of said lower portion;

said handle portion being for facilitating transport of said soldering station system;

said worktop pallet having a backing member, a main portion and a rotating portion;

said main portion being substantially rectangular, said main portion having a hole, said hole being substantially circular for receiving said rotating portion, such that a top surface of said main portion is substantially coplanar with a top surface of said rotating portion;

said main portion having a plurality of keyed sockets for receiving said tools; and said rotating portion being substantially circular and having a plurality of keyed sockets positioned in a spaced relationship adjacent to a perimeter edge of said rotating portion, said rotating portion having a center keyed socket positioned along a longitudinal axis of said rotating portion, said rotating portion being rotatably coupled to said backing member, such that said top surface and said plurality of keyed sockets of said rotating portion can be rotated with respect to said longitudinal axis of said rotating portion.

7. A method for positioning tools for working on wiring assemblies and electrical assemblies comprising:

providing a worktop surface having a front edge, a back edge and two side edges, said worktop surface having a plurality of keyed sockets for placing a plurality of tools and positioning an assembly;

providing a printed circuit board clamp having a shaft with a protrusion;

positioning said printed circuit board clamp into a keyed socked adapted for mating to said shaft, said keyed socket holding said printed circuit board clamp in a static vertical position relative to said worktop surface;

providing a solder dispensing spool having a shaft with a protrusion;

positioning said solder dispensing spool in one of said plurality of said keyed sockets such that said solder dispensing spool is positioned adjacent to a first one of said two side edges;

providing a soldering iron holder having a shaft with a protrusion;

positioning said soldering iron holder into a keyed socket adapted for mating to said shaft, said keyed socket holding said soldering iron in a static vertical portion relative to said worktop surface, said soldering iron holder being positioned such that said soldering iron is positioned adjacent to a second one of said two side edges;

providing a soldering iron cleaning pad having a shaft with a protrusion;

positioning said soldering iron cleaning pad into a keyed socket adapted for mating to said shaft, said keyed socket holding said soldering iron cleaning pad in a static vertical position relative to said worktop surface, said soldering iron cleaning pad being positioned such that said soldering iron cleaning pad is positioned in a corner defined by said back edge and a second one of said two side edges whereby said soldering iron cleaning pad is positioned substantially behind said soldering iron holder.

8. The method of positioning tools for working on wiring assemblies and electrical assemblies of claim 7, further comprising:

providing a rotatable portion being substantially circular and having a central keyed socket and a plurality of perimeter keyed sockets whereby said perimeter keyed sockets rotate around said central keyed socket;

positioning said printed circuit board clamp into said central keyed socket.

9. The method of positioning tools for working on wiring assemblies and electrical assemblies of claim 8, further comprising:

providing a plurality of wire clamps having a shaft with a protrusion;

positioning each of said plurality of clamps into one of said plurality of perimeter keyed sockets.

10. A soldering station system comprising:

a tool case having a bottom portion, a plurality of side portions, and a top portion;

a tool pallet assembly coupled to an interior surface of said case, said tool pallet having a plurality of interior recesses;

a plurality of tools, each one of said plurality of tools positioned in an associated one of said interior recesses of said tool pallet such that each of said plurality of tools is readily available and its presence or absence is visually apparent to the operator reducing the probability of losing one of said plurality of tools;

said tool case having a central portion and a lower portion, said lower portion having a lower portion bottom wall and four lower portion side walls extending upwardly from a perimeter edge of said lower portion bottom wall;

said central portion having a central portion bottom wall and four central portion side walls extending upwardly from a perimeter edge of said central portion bottom wall, a rear one of said lower portion side walls being removably hingably coupled to a rear one of said central portion side walls such that a bottom surface of said central portion, along with said lower side walls and said lower portion bottom wall form a cavity when said lower portion is hinged in a closed portion relative to said central portion; and said plurality of tools including a soldering iron, a solder dispensing spool, a plurality of wire clamps, and a printed circuit board clamp, said tools being for working of wiring and electronic assemblies.

11. A soldering station system comprising:

a tool case having a bottom portion, a plurality of side portions, and a top portion;

a tool pallet assembly coupled to an interior surface of said case, said tool pallet having a plurality of interior recesses;

a plurality of tools, each one of said plurality of tools positioned in an associated one of said interior recesses of said tool pallet such that each of said plurality of tools is readily available and its presence or absence is visually apparent to the operator reducing the probability of losing one of said plurality of tools;

said tool case having a central portion and a lower portion, said lower portion having a lower portion bottom wall and four lower portion side walls extending upwardly from a perimeter edge of said lower portion bottom wall;

said central portion having a central portion bottom wall and four central portion side walls extending upwardly from a perimeter edge of said central portion bottom wall, a rear one of said lower portion side walls being removably hingably coupled to a rear one of said central portion side walls such that a bottom surface of said central portion, along with said lower side walls and said lower portion bottom wall form a cavity when said lower portion is hinged in a closed portion relative to said central portion;

a worktop pallet, said worktop pallet being removably coupled to an interior of said lower portion;

said worktop pallet having a plurality of keyed sockets; each one of said plurality of keyed sockets having a cavity; said cavity having at least one grooved portion;

said cavity and said grooved portion being for receiving and retaining one of said plurality of tools in a static vertical position relative to said worktop pallet;

said worktop pallet having a backing member, a main portion and a rotating portion;

said main portion being substantially rectangular, said main portion having a hole, said hole being substantially circular for receiving said rotating portion, such that a top surface of said main portion is substantially coplanar with a top surface of said rotating portion;

said main portion having a plurality of keyed sockets for receiving said tools; and said rotating portion being substantially circular and having a plurality of keyed sockets positioned in a spaced relationship adjacent to a perimeter edge of said rotating portion, said rotating portion having a center keyed socket positioned along a longitudinal axis of said rotating portion, said rotating portion being rotatably coupled to said backing member, such that said top surface and said plurality of keyed sockets of said rotating portion can be rotated with respected said longitudinal axis of said rotating portion.

* * * * *